United States Patent [19]
Shichman et al.

[11] 3,776,054
[45] Dec. 4, 1973

[54] POWER TRANSMISSION BELTS

[75] Inventors: Daniel Shichman, Trumbull, Conn.; Henry F. Miller, Clifton; Nann Ren, Wayne, both of N.J.

[73] Assignee: Uniroyal, Inc., New York, N.Y.

[22] Filed: Dec. 11, 1972

[21] Appl. No.: 314,247

Related U.S. Application Data

[63] Continuation-in-part of Ser. No. 214,573, Jan. 3, 1972.

[52] U.S. Cl. .................. 74/233, 74/231 R, 156/138
[51] Int. Cl. .............................................. F16g 5/16
[58] Field of Search ................. 74/231 C, 237, 233, 74/231 R; 156/137, 138, 139, 140

[56] References Cited
UNITED STATES PATENTS

| | | | |
|---|---|---|---|
| 2,847,865 | 8/1958 | Rockoff | 74/233 |
| 3,016,756 | 1/1962 | Jackel | 74/237 |
| 2,281,148 | 4/1942 | Freedlander | 74/233 |

FOREIGN PATENTS OR APPLICATIONS

| | | | |
|---|---|---|---|
| 264,984 | 1927 | Great Britain | 74/233 |

*Primary Examiner*—Manuel A. Antonakas
*Assistant Examiner*—R. H. Lazarus
*Attorney*—Norbert P. Holler

[57] ABSTRACT

Molded "V" or variable speed power transmission belts, made of elastomeric material and reinforced by an array of longitudinal tension cords at their wider or top faces, and having generally saddle-shaped stress concentration-reducing and flexibility-enhancing notches on their narrower faces, are disclosed. Each notch decreases in both depth and width from respective maximum values of those dimensions at the lateral belt edges to respective minimum values in the middle region of the belt. In each notch, therefore, the belt has more rubber in its middle region that at its sides, so that extra support is provided for the tension cords in the middle region of the belt. The extra support contributes to a reduction in the deviation of the strain ratio between the center tension cord and the laterally outermost tension cords from unity when the belt is running, and thereby minimizes "dishing" of the belt in a transverse direction. Belts having notches of the disclosed saddle-shaped configuration thus are characterized by longer service life and/or higher horsepower capacity. This abstract is not to be taken either as a complete exposition or as a limitation of the present invention, however, the full nature and extent of the invention being discernible only by reference to and from the entire disclosure.

16 Claims, 11 Drawing Figures

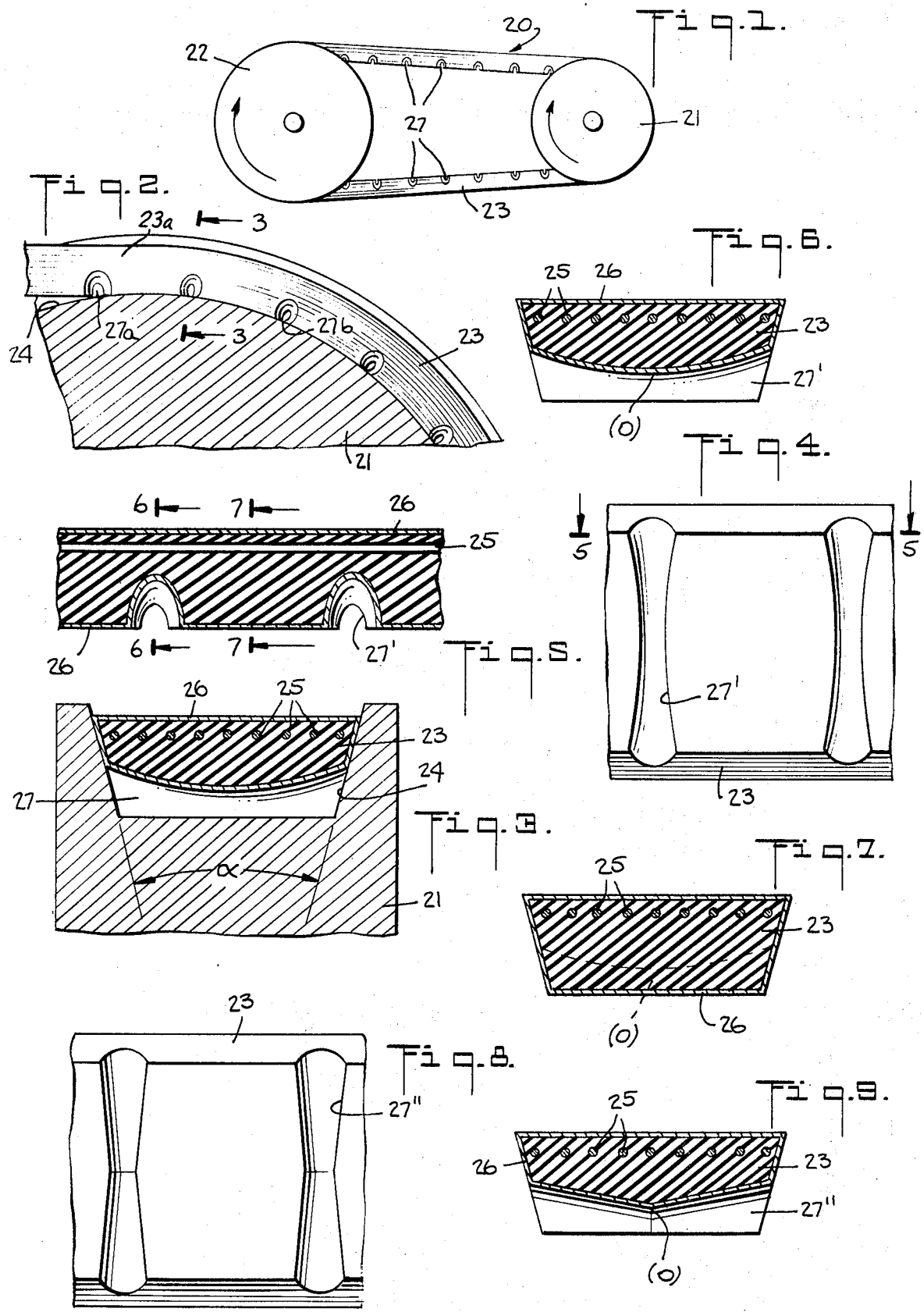

POWER TRANSMISSION BELTS

The instant application is a continuation-in-part of our prior copending application Ser. No. 214,573, filed Jan. 3, 1972.

This invention relates to power transmission belts having a generally trapezoidal cross-section, such as "V" belts and variable speed belts, and more particularly to belts of this type having flexibility-enhancing and stress concentration-reducing notches on their undersides.

"V" and variable speed power transmission belts designed for transmitting power from a driving pulley to a driven pulley and provided with flexibility-enhancing and stress concentration-reducing notches on their undersides, i.e. on their narrower faces which are directed toward the pulleys when in use, are known. See, for example, U.S. Pat. Nos. 1,656,628; 2,625,828; 2,847,865; and 2,945,389. Conventional belts of this type are of uniform cross-section thickness in the unnotched portions thereof and utilize a standard notch profile, i.e. the notches have their a "U" or a "V" shaped cross-section, and the notch profile also in uniform across the entire width of the belt. When in use, i.e. running under load, such belts become subject to a concave deformation, known as "dishing", throughout substantially the entire extent of the belt-pulley engagement. The "dishing" effect is a function of the outer tension cords of the belt carrying more load than the inner or middle cords, i.e. of a non-uniform distribution of stress among the cords over the transverse dimension of the belt, due to the friction between the belt sides and the pulley groove walls. Such non-uniformity of stress distribution creates a strain ratio between the center tension cord of the belt and the outer tension cords, which is less than unity to an undesirable degree, i.e. it may be as much as 1:5 or so. The result "dishing" tends in practice to foreshorten belt life through premature cord breakage, early ply separation, severe side jacket wear, early side edge crack formation, and early radial crack formation. These problems have not been solved by the known notched belts in which, though flexibility was improved, uniformity of stress distribution transversely over the belt width among the tension cords has, as far as known, not be attainable.

It is, therefore, the primary object of the present invention to provide a notched, molded "V" or variable speed power transmission belt construction characterized by a novel profile or configuration of the notches and a concomitant more uniform stress distribution transversely of the belt over all tension or strength cords thereof.

Generally speaking, the objectives of the present invention are attained by providing in such "V" and variable speed belts a plurality of transverse notches each decreasing in both its depth and width from the notch ends to the middle thereof and thus having a saddle-like shape corresponding to the configuration of a hyperbolic paraboloid. In particular, the notches decrease curvilinearly in both depth and width from the respective maximum values thereof at the belt sides to the respective minimum values thereof at the mid-line of the belt, if the notch has a true hyperbolic paraboloid configuration, but the said notch dimensions can decrease rectilinearly if it is desired merely to approximate such a configuration in order to simplify the belt molding operation. In either case, the belt has a greater thickness of rubber under the middle tension cords than under the outer ones. This ensures that the stress distribution among the tension cords of the belt, when the same is in use, will be as uniform as is possible in the circumstances, and that the strain ratio between the center tension cord and the laterally outermost tension cords of the belt is as near unity as possible, preferably on the order of about 1:1.5 or so, so that "dishing" of the belt and the disadvantages flowing therefrom are effectively avoided.

The foregoing and other objects, characteristics and advantages of the present invention will be more clearly understood from the following detailed description thereof when read in conjunction with the accompanying drawings, in which:

FIG. 1 is a generally schematic side elevational view of a belt and pulley drive system utilizing a "V" or variable speed belt having in its underside a plurality of saddle-shaped notches according to the present invention;

FIG. 2 is an enlarged view of the driving pulley portion of the system shown in FIG. 1, parts being broken away to illustrate the changes in the notch cross-section as the belt moves around the pulley;

FIG. 3 is a fragmentary sectional view taken along the line 3—3 in FIG. 2;

FIG. 4 is a fragmentary bottom plan view of the belt shown in FIG. 1, illustrating the same as having a curvilinearly varying notch profile according to one embodiment of the invention;

FIG. 5 is a sectional view taken along the line 5—5 in FIG. 4;

Figure 10:
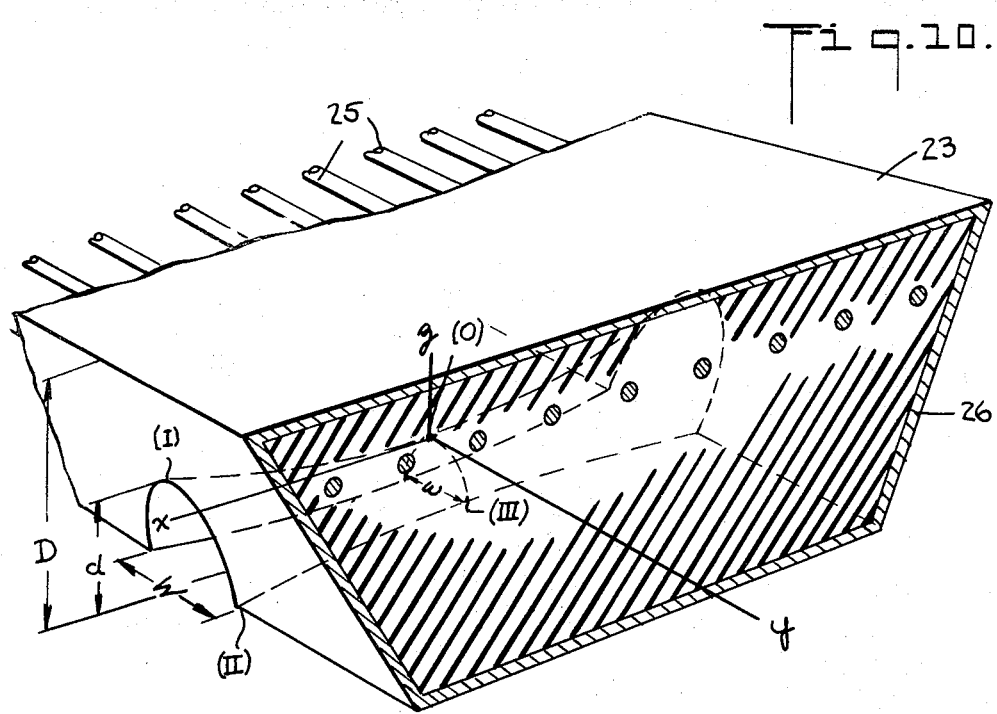
Figure 11:
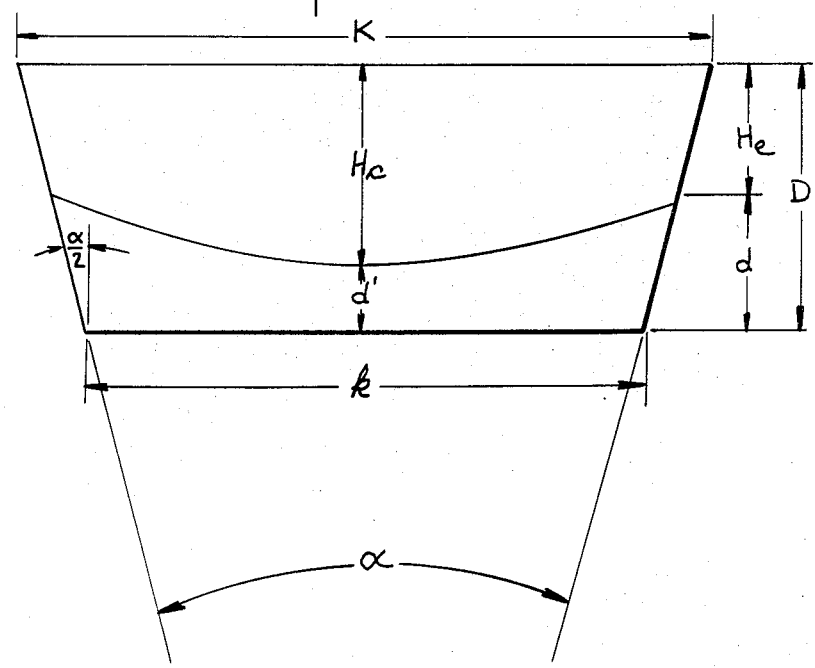

FIGS. 6 and 7 are sectional views taken, respectively, along the lines 6—6 and 7—7 in FIG. 5;

FIG. 8 is a fragmentary bottom plan view, similar to FIG. 4, of the belt shown in FIG. 1, but illustrating the same as having a rectilinearly varying notch profile according to another embodiment of the invention;

FIG. 9 is a sectional view, similar to FIG. 6, of the belt shown in FIG. 8;

FIG. 10 is an enlarged transverse section, in perspective, through a belt having a curvilinearly varying saddle-shaped notch according to the present invention and illustrates the configuration and dimensions of the notch with respect to an orthogonal system of coordinates; and FIG. 11 is a diagrammatic view of the belt section outline and graphically illustrates the derivation of the notch parameters.

Referring now to the drawings in greater detail, the drive system 20 shown in FIG. 1 comprises a driving pulley 21, a driven pulley 22, and a drive belt 23 of trapezoidal cross-section, e.g. a "V" or variable speed belt, trained about and interconnecting the pulleys. Each of the pulleys, as is shown for the pulley 21 in FIG. 3, has a peripheral V-shaped groove 24 the sides of which are disposed at an outwardly directed angle $\alpha$ to each other, to accommodate the belt 23. The belt is a molded structure composed of a body of elastomeric material, e.g. natural or synthetic rubber or a rubber-like polymer or a blend thereof, and is reinforced by a plurality of tension cords or like strength members 25 extending in a generally planar array longitudinally through the belt adjacent its wider or top side. It should be understood that the cords 25 are shown relatively widely spaced for purposes of illustration only and that in an actual belt they will normally be disposed in relatively close proximity to one another. Normally the belt will also have a covering 26 of wear-resistant rubberized fabric vulcanized thereto over its entire surface. On its underside i.e. the narrower or pulley side, the belt 23 is provided with a plurality of transverse notches 27. Each of such notches in accordance with the basic aspects of the invention has a generally saddle-shaped profile to be more fully described presently.

As previously pointed out, the provision of notches per se in the underside of any "V" or variable speed belt for purposes of increasing belt flexibility and reducing stress concentrations as the belt passes around a pulley is well known. It might be noted in passing, however, that although the protuberances defined on the underside of the belt between the notches are sometimes described as being cogs or cog-like, this designation is actually a misnomer, since, unlike the teeth provided on positive drive belts, these protuberances are neither designed nor intended for, nor capable of, use in the transmission of motion from a toothed pulley to the belt or from the belt to such a pulley.

In general, when the system 20 is in operation, the notch in each incremental belt portion, designated 23a in FIG. 2, approaching the driving pulley 21 is opened to its maximum extent, as shown at 27a in FIG. 2. As this belt portion enters the groove 24 of the pulley and begins to move in its circular path about the same, the notch in that portion starts to close by virtue of the belt being subjected to compression at its underside or pulley face, ultimately becoming fully or almost fully closed at its narrowest or middle region, as shown at 27b in FIG. 2. Test have shown that the notch tends to reach its maximum closed state at about the time it has traveled through approximately 7.5° of arc around the pulley. It is one of the principal features of the present invention, therefore, that the notch profile must be characterized by a minimun notch width at the middle region of the belt sufficient to ensure that even under the maximum degree of compression of the belt, i.e. when it is passing over the smallest diameter pulley with which it is to be used, the narrowest portion of each notch will either not close at all or will be no more than just lightly closed.

Referring now to FIGS. 4 to 7 and 10, each notch 27 may be considered as lying in an orthogonal system of coordinates (FIG. 10) having its origin, designated (0) in FIG. 10 (see also FIGS. 6 and 7), located on the notch surface at the point of intersection between the longitudinal plane of symmetry of the belt and the transversely extending mid-plane of the notch, with the $x$, $y$ and $z$ axes being oriented, respectively, in the directions of the length, width and depth of the notch. The basic notch configuration contemplated by the present invention is designated 27′ (see also FIGS. 4 and 5) and, as already mentioned, is one which decreases curvilinearly in both depth and width from respective maximum values of those dimensions at the sides of lateral edges of the belt to respective minimum values thereof at the middle of the belt. In particular, the notch surface 27′ follows the contours of a hyperbolic paraboloid defined by the equation $$z = (x^2/a^2) - (y^2/b^2) \quad (1)$$

wherein a and b are constants determined, respectively, as will be more fully explained presently, by the coordinates of a pair of selected, known points (designated (I) and (II) in FIG. 10) on the notch surface at one of the sides of the belt. The ultimate notch contours, however, are subject to the conditions that: the ratio of the maximum belt section thickness to the maximum notch depth at the sides of the belt, i.e. $D/d$ in FIGS. 10 and 11, should lie between about 1.91 and 4.37; the ratio of the said maximum notch depth to the minimum notch depth at the center of the belt, i.e. $d/d'$, should lie between about 1.25 and 2.29; the maximum notch width W at the belt edges may not be greater than the pitch length, i.e. the distance between centerlines of successive notches; and the minimum notch width w at the center of the belt must be sufficient that at that region the notch will not close or at most will just close lightly when the belt is passing over the smallest diameter pulley with which it is used. The preferred value for each of the ratios $D/d$ and $d/d'$ is 2.

Alternatively, but subject to the same conditions, the said notch configuration can be approximated by one, designated 27″ (see FIGS. 8 and 9), in which, although the notch cross-section is still parabolic, the depth and width thereof decrease rectilinearly from the belt sides to the center. Such an approximation might be used where a reduction of the cost of manufacture of the belt through a simplification of the tooling of the mold to its intended contours is desired.

In either case, of course, the provision of the generally saddle-shaped notch configuration ensures that the thickness $H_c$ of elastomeric material in the center region of the belt is greater than the thickness $H_e$ of the elastomeric material at the sides of the belt. In this way, the normally encountered overloading of the belt at its edges is effectively counteracted and the strain distribution among the cords over the entire width of the belt is made as uniform as possible.

To illustrate the implementation of the present invention, let it be assumed that a saddle-shaped notch configuration with curvilinearly varying depth and width is to be determined for a 1930-series V-belt having a section thickness D of seven-sixteenths or 0.438 inch, a ratio $D/d$ of 2.0, a ratio of $d/d'$ of 2.0, a pitch length of ½ or 0.50 inch, and at the bottom edges or the belt sides a notch width W of 15/64 or 0.234 inch. The designation "1930" is a part of the numbering system adopted by the Rubber Manufacturers Association for such products, the first two digits representing the top section width of the belt in one-sixteenth inch increments, and the last two digits representing the pulley groove angle. The belt in question thus has a top section width K of 1 3/16 or 1.188 inches and a groove angle $\alpha$ (or its equivalent, the angle between the belt side edges) of 30°, and accordingly a bottom section width k of 61/64 or 0.953 inch since $k = K - 2D(\tan \alpha /2)$.

It will be apparent that with the foregoing information at hand, the coordinates $x_1$, $y_1$, $z_1$, and $x_2$, $y_2$, $z_2$, respectively, of points (I) and (II) on the notch surface are known, so that constants a and b can be readily determined. Thus, the coordinates of point (I) are $$x_1 = k/2 + d(\tan \alpha/2) = 0.535$$
$$y_1 = 0$$
$$z_1 = d/2 = 0.109,$$

and the coordinates of point (II) are $$x_2 = k/2 = 0.477$$

$$y_2 = W/2 = 0.117$$

$$z_2 = d/2 = -0.109.$$

Substituting the first of these sets of coordinates in equation (1) yields $$a = [(0.535)^2/0.109]^{1/2} = 1.62.$$

Now substituting this value of a and the second set of coordinates in equation (1) yields $$b = [(0.117)^2/(0.087 + 0.109)]^{1/2} = 0.267.$$

The full equation for the specific notch configuration under consideration thus is $$z = [x^2/(1.62)^2 - y^2/(0.267)^2] \qquad (1')$$

from which the coordinates of point (III) in FIG. 10 are seen to be $$x_3 = 0$$

$$y_3 = 0.0625$$

$$z_3 = -0.109.$$

The minimum notch width w at the center of the belt is, therefore, 0.125 or ⅛ inch.

To construct the actual surface of the notch, it is, of course, necessary to calculate a sufficient number of points between the sides of the belt which satisfy equation (1'). This can be done very simply by assigning incremental values to x and y and calculating the corresponding values of z. It will be understood that the smaller one makes these increments, the closer the calculated surface will approach the theoretical surface.

As will be clear to those skilled in the art, for other "V" or variable speed belts having different cross-sectionl dimensions or characterized by different dimensional ratios, the procedure for defining the respective notch surfaces is the same as described above.

The improved characteristics of belts according to the present invention will be readily comprehended from the following comparison of a set of 1930-series "V" belts, each having the dimensional features and ratios of the representative belt described above and a saddle-shaped notch profile derived from equation (1'), with four types of correspondingly dimensioned conventional 1930-series "V" belts with constant profile notches.

In one test, strain gage measurements were made as follows:

Each belt was passed in a taut condition over a flat driven pulley and a grooved driving pulley, with strain gages applied to the top belt surface over the center cord and one of the outer cords thereof. The torque applied to the driving pulley was kept at a value such that no slippage between the belt and the pulleys occurred. The belts were not run to destruction. The results are set forth in Table I below (the conventional belts are identified as No. 1 to No. 4) for various loading conditions expressed, as shown in the first column of the table, in two values in pounds, the higher value being the belt tension on the tight side (the side entering the driving pulley) and the lower value being the belt tension on the slack side.

TABLE I

| Loading condition in lbs., tight side/ slack side | Strain ratio between center and outer cords | | | | |
|---|---|---|---|---|---|
| | Belt #1 | Belt #2 | Belt #3 | Belt #4 | Saddle notch belt |
| 280/75 | 1:2.8 | 1:3.6 | 1:4.7 | 1:2.3 | 1:1.9 |
| 220/70 | 1:2.4 | 1:3.3 | 1:4.4 | 1:2.2 | 1:1.8 |
| 150/45 | 1:1.9 | 1:2.6 | 1:3.8 | 1:2.0 | 1:1.7 |
| 70/30 | 1:1.3 | 1:2.4 | 1:3.6 | 1:1.9 | 1:1.4 |

It will be seen that the belt construction utilizing saddle-shaped notches with a greater amount of rubber under the center tension cord or strength member than under the outer ones according to the present invention, is characterized by a center cord to outer cord strain ratio significantly closer to unity than the various conventional belts. This clearly indicates that under various loads there is a more uniform load or stress distribution among the tension cords (and in the rubbery matrix) of a saddle-notch belt than among the cords in a conventional, constant profile-notch belt, which will both minimize the dishing effect and its attendant disadvantages hereinbefore pointed out, and bring about the mentioned advantages.

To illustrate, for example, the increase in belt life which characterizes the saddle-notch belt construction according to the present invention, a group of belts of the same types as are listed in Table I were subjected to an accelerated life test as follows:

Each belt was passed over and suspended from a grooved driving pulley mounted at a fixed location and under a weighted, vertically movable, grooved driven pulley suspended by the belt in the lower bight thereof. The driving pulley was run at a constant speed, so that the belts were repeatedly flexed while under tension, simulating actual operating conditions. Each belt was examined periodically for signs of incipient failure as evidenced by notch cracking, jacket failure, edge cracking, etc., and a belt was considered to have failed when it could no longer carry the applied load.

Under this test, the saddle-notch belt construction had a running life of more than 400 hours, i.e. there was no failure before the test program was halted. In contrast thereto, none of the conventional belts had a running life of more than 220 hours, and only one belt reached that figure. It is clear, therefore, that the minimization of the deviation of the center cord to outer cord strain ratio from unity effected by the saddle-shaped notch configuration leads to a significant increase in the useful or service life or belts according to the present invention.

It will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

Having thus described our invention, what is claimed and desired to be protected by Letters Patent is:

1. In a power transmission belt of the type having a body of molded material, which body is of generally trapezoidal cross-section and has opposite longitudinal top and bottom faces of which the latter is narrower than the former and is directed toward the pulley axes when the belt is in use, and which body is provided at said narrower body face thereof with a plurality of longitudinal spaced transverse notches each extending from one lateral edge of the belt to the other; the improvement comprising a notch configuration wherein both the depth and the width of each notch decrease from respective maximum values thereof at said lateral belt edges to respective minimum values in the middle region of the belt, said body thereby having a greater thickness of said material under the middle region of said wider top face than under the lateral edge regions of the same for minimizing the ratio of the strain in said lateral edge regions of the belt to the strain in said middle region of the belt when the same is in use.

2. A belt as claimed in claim 1, wherein the decrease in said depth and width of each notch is generally curvilinear.

3. A belt as claimed in claim 1, wherein the decrease in said depth and width of each notch is generally rectilinear.

4. A belt as claimed in claim 1, wherein said notch configuration is generally saddle-shaped in appearance.

5. A belt as claimed in claim 1, wherein said notch configuration is generally of a hyperbolic paraboloid shape defined by the equation $$z = (x^2/a^2) - (y^2/b^2)$$

where $x$, $y$ and $z$ are, respectively, the length, width and depth of each notch as measured in an orthogonal system of coordinates having its origin on the surface of that notch and at the intersection of the longitudinal plane of symmetry of the belt with the transversely extending mid-plane of that notch, and $a$ and $b$ are constants determined, respectively, for each size of belt by the coordinates of a pair of known and specified points (I) and (II) on the notch surface at one of said lateral edges of the belt.

6. A belt as claimed in claim 1, wherein the ratio of the maximum belt thickness between said top and bottom faces of said body to the maximum notch depth is between about 1.91 and 4.37, and wherein the ratio of said maximum notch depth to the minimum notch depth is between about 1.25 and 2.29.

7. A belt as claimed in claim 1, wherein the ratio of the maximum belt thickness between said top and bottom faces of said body to the maximum notch depth is 2, and wherein the ratio of said maximum notch depth to the minimum notch depth is 2.

8. A belt as claimed in claim 1, wherein the maximum notch width is not greater than the pitch length between adjacent notches, and wherein the minimum notch width is predetermined to ensure that at said middle region of the belt the notch will not close or at most will just close lightly when the belt is passing over the smallest diameter pulley with which it is used.

9. In a power transmission belt of the type having a body of molded material, which body is of generally trapezoidal cross-section and has opposite longitudinal top and bottom faces of which the latter is narrower than the former and is directed toward the pulley axes when the belt is in use, and which body has a generally planar transverse array of tension cords extending longitudinally of the belt intermediate said top and bottom faces of said body, and which body is further provided at said narrower bottom surface thereof with a plurality of longitudinally spaced transverse notches terminating short of said array of tension cords and each extending from one lateral edge of the belt to the other; the improvement comprising a notch configuration wherein both the depth and the width of each notch decreases from respective maximum values thereof at said lateral belt edges to respective minimum values in the middle region of the belt, said body thereby having a greater thickness of said material under the middle region of said wider top face than under the lateral edge regions of the same for minimizing the deviation of the center cord to outer cord strain ratio from unity when the belt is in use.

10. A belt as claimed in claim 9, wherein the ratio of the maximum belt thickness between said top and bottom faces of said body to the maximum notch depth is between about 1.91 and 4.37, and wherein the ratio of said maximum notch depth to the minimum notch depth is between about 1.25 and 2.29.

11. A belt as claimed in claim 9, wherein the ratio of the maximum belt thickness between said top and bottom faces of said body to the maximum notch depth is 2, and wherein the ratio of said maximum notch depth to the minimum notch depth is 2.

12. A belt as claimed in claim 9, wherein the maximum notch width is not greater than the pitch length between adjacent notches, and wherein the minimum notch width is predetermined to ensure that at said middle region of the belt the notch will not close or at most will just close lightly when the belt is passing over the smallest diameter pulley with which it is used.

13. A belt as claimed in claim 9, wherein said notch configuration is generally of a hyperbolic paraboloid shape defined by the equation $$z = (x^2/a^2) - (y^2/b^2)$$

where $x$, $y$ and $z$ are, respectively, the length, width and depth of each notch as measured in an orthogonal system of coordinates having its origin on the surface of that notch and at the intersection of the longitudinal plane of symmetry of the belt with the transversely extending mid-plane of that notch, and $a$ and $b$ are constants determined, respectively, for each size of belt by the coordinates of a pair of known and specified points (I) and (II) on the notch surface at one of said lateral edges of the belt.

14. A belt as claimed in claim 13, wherein the ratio of the maximum belt thickness between said top and bottom faces of said body to the maximum notch depth is between about 1.91 and 4.37, and wherein the ratio of said maximum notch depth to the minimum notch depth is between said 1.25 and 2.29.

15. A belt as claimed in claim 13, wherein the ratio of the maximum belt thickness between said top and bottom faces of said body to the maximum notch depth is 2, and wherein the ratio of said maximum notch depth to the minimum notch depth is 2.

16. A belt as claimed in claim 13, wherein the maximum notch width is not greater than the pitch length between adjacent notches, and wherein the minimum notch width is predetermined to ensure that at said middle region of the belt the notch will not close or at most will just close lightly when the belt is passing over the smallest diameter pulley with which it is used.

* * * * *